(12) United States Patent
Vasil et al.

(10) Patent No.: US 7,107,242 B1
(45) Date of Patent: Sep. 12, 2006

(54) ELECTRONIC TRANSACTION SECURITY METHOD

(76) Inventors: Paul E. Vasil, 3 Harding Rd., Medway, MA (US) 02053; Ronald W. Sandstorm, 95 Ridge St., Winchester, MA (US) 01890

( * ) Notice: Subject to any disclaimer, the term of this patent is extended or adjusted under 35 U.S.C. 154(b) by 874 days.

(21) Appl. No.: 09/718,179

(22) Filed: Nov. 21, 2000

(51) Int. Cl.
*G06F 17/60* (2006.01)
(52) U.S. Cl. .............................. 705/39; 705/35; 705/44
(58) Field of Classification Search ................. 705/35, 705/39, 44
See application file for complete search history.

(56) References Cited

U.S. PATENT DOCUMENTS

| | | | |
|---|---|---|---|
| 5,189,700 A | 2/1993 | Blandford | |
| 5,613,001 A | 3/1997 | Bakhoum | |
| 5,781,630 A | 7/1998 | Huber et al. | |
| 5,826,241 A | 10/1998 | Stein et al. | |
| 5,864,667 A * | 1/1999 | Barkan | 713/201 |
| 5,943,426 A * | 8/1999 | Frith et al. | 713/153 |
| 5,956,699 A | 9/1999 | Wong et al. | |
| 6,029,154 A | 2/2000 | Pettitt | |
| 6,035,288 A | 3/2000 | Solomon | |
| 6,041,308 A | 3/2000 | Walker et al. | |
| 6,058,189 A | 5/2000 | McGough | |
| 6,070,154 A | 5/2000 | Tavor et al. | |
| 6,530,023 B1 * | 3/2003 | Nissl et al. | 713/200 |
| 2003/0097343 A1 * | 5/2003 | Pinizzotto | 705/75 |

* cited by examiner

*Primary Examiner*—Alain L. Bashore
(74) *Attorney, Agent, or Firm*—Pandiscio & Pandiscio

(57) ABSTRACT

A software-based computer method for limiting the lifetime of an electronic credit card transaction that makes the transmitted credit card information useless when a configurable time limit expires. The method is designed to provide protection for electronic transactions that require use of an identifying key such as a credit card number, with or without an additional unique identifier comprising a sequence of alphanumeric values, such as a PIN, for the purpose of initiating a transaction. The method provides protection by the addition of a transaction-initiated date/time stamp which is included as part of the transmitted transaction information and provides the basis for limiting the amount of time the transaction is valid.

19 Claims, 2 Drawing Sheets

ELECTRONIC TRANSACTION SECURITY METHOD

FIELD OF THE INVENTION

The present invention relates to the electronic processing of credit card transactions.

BACKGROUND OF THE INVENTION

Credit cards are commonly used over the public Internet to purchase goods and services. The information required to initiate a transaction consists of a credit card number, an expiration date for the card, a cardholder's billing address and the card holder's name as shown on the card. All of the information made available to support a credit card transaction may become known to a third party who is then in a position to use the same without the consent or knowledge of the cardholder. The fact that the credit card information can be re-used by a third party without the consent or knowledge of the card holder creates a problem for both the cardholder and the institution that issued the credit card.

SUMMARY OF THE INVENTION

A primary object of this invention is to provide a method and arrangement for securing electronic transactions against fraud.

Another object of this invention is to provide a method and an arrangement that serves to limit the useful lifetime of credit card transaction information.

A more specific object of the present invention is to define a method and an arrangement that creates or enables, at the time that an electronic credit card transaction is initiated, a date/time stamp that is based on or obtained from a non-adjustable clock. The date/time stamp is embedded in or accompanies the credit card transaction information provided by the user and serves to limit the useful lifetime of that transaction information. The method and arrangement also provides for checking the date/time stamp against a non-adjustable clock the instant that the credit card transaction information is received to verify that the transaction information is valid and that the transaction should proceed. The method of the present invention is applicable to all credit card transactions as well as other electronic transactions that need or would benefit from a limit on the useful lifetime of transaction information.

With respect to the method of the present invention, it is to be understood that a non-adjustable clock is an accurate clock which is fixed in the sense that it cannot be adjusted by a party to the electronic transaction and which is available to both the initiator and validator of the transaction. It is contemplated the initiator and the validator may access different non-adjustable clocks provided that they provide identical internet times (net-time). A net-time date/time stamp is understood to be a date/time stamp created from a non-adjustable clock available on the internet. To allow for different time zones at the locations of the initiator and validator, the date/time stamp is keyed to a common time standard, e.g., Greenwich mean time. The most common on-line sources for a non-adjustable clock are accessible on servers run by the U.S. government and other institutions. A preferred source is the master clock of the U.S. Naval Observatory. The latter is available on line on the internet at the following address: http://tycho.usno.navy.mil". The method of the present invention allows for the use of any encryption scheme whereby the encryption technique is supplied by the credit card institution or provider of the method.

BRIEF DESCRIPTION OF THE DRAWINGS

An embodiment of the invention is depicted in the drawings and elucidated in the following description, in which.

DETAILED DESCRIPTION

Figure 1:
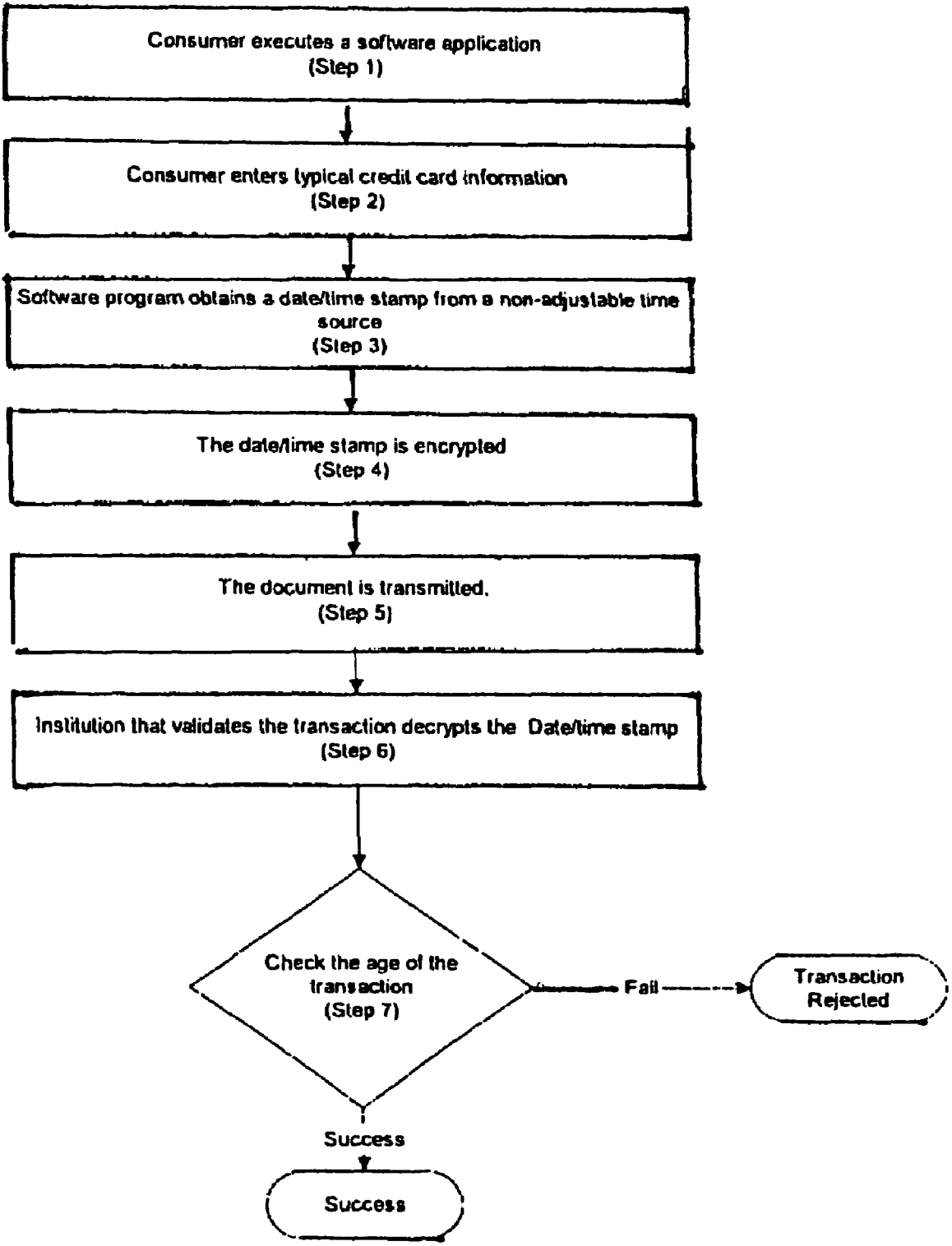
FIG. 1 shows a software flowchart representing the method of the present invention.

A typical credit card transaction consists of an account number, a credit card holder's name and a credit card expiration date. Occasionally other information, e.g., a personal identification number (PIN), may be gathered to help validate the transaction (the PIN, which may be represented by a sequence of alphanumeric characters in any combination, is intended to be known only to the issuing institution and the customer or user). All of this credit card information is passed to the entity that is brokering the transaction, namely the credit card issuer or another party acting on behalf of or for the credit card issuer, for verification and validation. In the usual case the information is transmitted to the validating institution by a third party vendor. However, it is understood that in some cases the user may deal directly with the validating institution, e.g., where the credit card issuer is a bank with whom the user has a bank account and the user desires to execute an electronic transfer of funds from his bank account. The present invention improves on the security of electronic financial transactions by including an encrypted date/time stamp that is passed along as part of the information required to secure the transaction against fraud, i.e., to obtain validation of the transaction information. The encryption scheme may use all or part of a credit card account number and/or a PIN known only to the cardholder and the institution issuing the credit card to ensure that the date/time stamp cannot be generated by an unauthorized entity.

The software that implements the method of this invention may be embedded in the user's (customer's) web browser or may be a separate program that can be accessed on command by that web browser. The software maybe in the form of an active X-control, a Java applet, or any other program that can execute in a web browser.

According to a preferred embodiment of the invention, the software that executes in the browser first obtains a date/time stamp from a known non-adjustable time source such as the master clock of the U.S. Naval Observatory, and then encrypts it using a predetermined encryption technique or program. The encrypted date/time stamp is passed along with other credit card transaction information to a validating institution for processing, as described hereinafter. In this preferred embodiment, an example code fragment of the embedded software code is:

x=nettime( );
y=encrypt(x);
return y;

where "nettime" is the date/time data obtained from a non-adjustable time source.

Further details of the preferred embodiment of the present invention are presented in the following description of the method illustrated by FIG. 1. This method assumes as a preliminary matter that individual credit card accounts have been established by a credit card issuer for a number of different users and that each account and its authorized user (credit card holder or a person authorized to act for the card holder) are identified by one or more unique identification codes, and also that the account and user identification codes and other information pertaining to each account is stored in a data base created and maintained by the credit card issuer and/or some other party authorized by the credit card issuer to validate proposed credit card transactions on behalf of the credit card issuer. It is to be understood also that the method of FIG. 1 applies to electronic transactions involving only the credit card user and the credit card issuer or validating institution, as well as to transactions involving a third party vendor from whom the user wishes to purchase goods or services. Accordingly, although not shown in FIG. 1, it is to be understood that if the proposed transaction involves a third party vendor, the transmittal of information between the user and validating institution is conducted via the vendor's server. With the foregoing in mind, FIG. 1 comprises the following steps:

1. Using an internet browser, the consumer or customer (user) executes a software application according to the invention for the purpose of initiating a credit card transaction. The software is designed to carry out the method represented in FIG. 1 and includes a component supplied by the credit card processing institution (and embedded in the software application or the browser) which is adapted to obtain and encrypt a date/time stamp, delivering an encrypted date/time stamp in the form of a series of alphanumeric values.

2. The transaction is initiated by filling out a transaction information form that is made available by the software application through an internet browser. Such a form is commonly used by on-line retailers for the collection of personal information including the name, address, and credit card number of the consumer, and the credit card expiration date.

3. After the credit card transaction information is gathered, a date/time stamp is obtained from a non-adjustable time source via the internet.

4. The date/time stamp is encrypted by the software program executed in the browser for inclusion with the credit card information to be transmitted. Various encryption programs known to persons skilled in the art may be used for this invention since the type of encryption technique is not critical to the invention described here. However, it is to appreciated that the better the encryption technique, the more secure the transaction will be. What is important is that the selected encryption scheme be known only to the institution validating the transaction and to the software that encrypts the date/time stamp when the customer information is entered.

5. The encrypted date/time stamp and the other information representing the proposed transaction (the "document") is transmitted via the internet to a destination where it is to be validated. In the case where the transaction is being conducted with a third party vendor via the internet, transmission of the transaction information to the validating institution is accomplished via the vendor's server. Preferably this is done automatically by the vendor's server; alternatively it may be done only on command by the vendor.

6. On arrival at the validating institution's server, the credit card holder's transaction information is compared with credit card information stored in or available to that server in order to verify that the transaction is initiated by an authorized user, as is normal practice for existing credit card transaction systems. In this case, the verification and validation process involves decrypting the date/time stamp using the selected decryption technique to determine the exact time that the transaction was initiated.

7. The decrypted date/time stamp representing the exact time the truncation was initiated is compared with a new date/time stamp created from the time obtained by the validating institution from a non-adjustable time source via the internet. The difference between (a) the time of the date/time stamp assigned to the transaction (the "transaction date/time stamp") and (b) the new date/time stamp representing the time obtained by the validating institution from the non-adjustable time source is then compared with a known time limit known only to the entity that has the responsibility of validating or rejecting the transaction. If the time limit has been exceeded the transaction is considered not to be valid and is rejected, and the rejection is communicated back to the vendor and/or the car holder or other party who initiated the transaction. If the time difference is at or within the time limit, the transaction is validated (provided, of course, that the remainder of the transaction information has been deemed valid) and that transaction validation is communicated back to the vendor and card holder or other party who initiated the transaction process.

Figure 2:
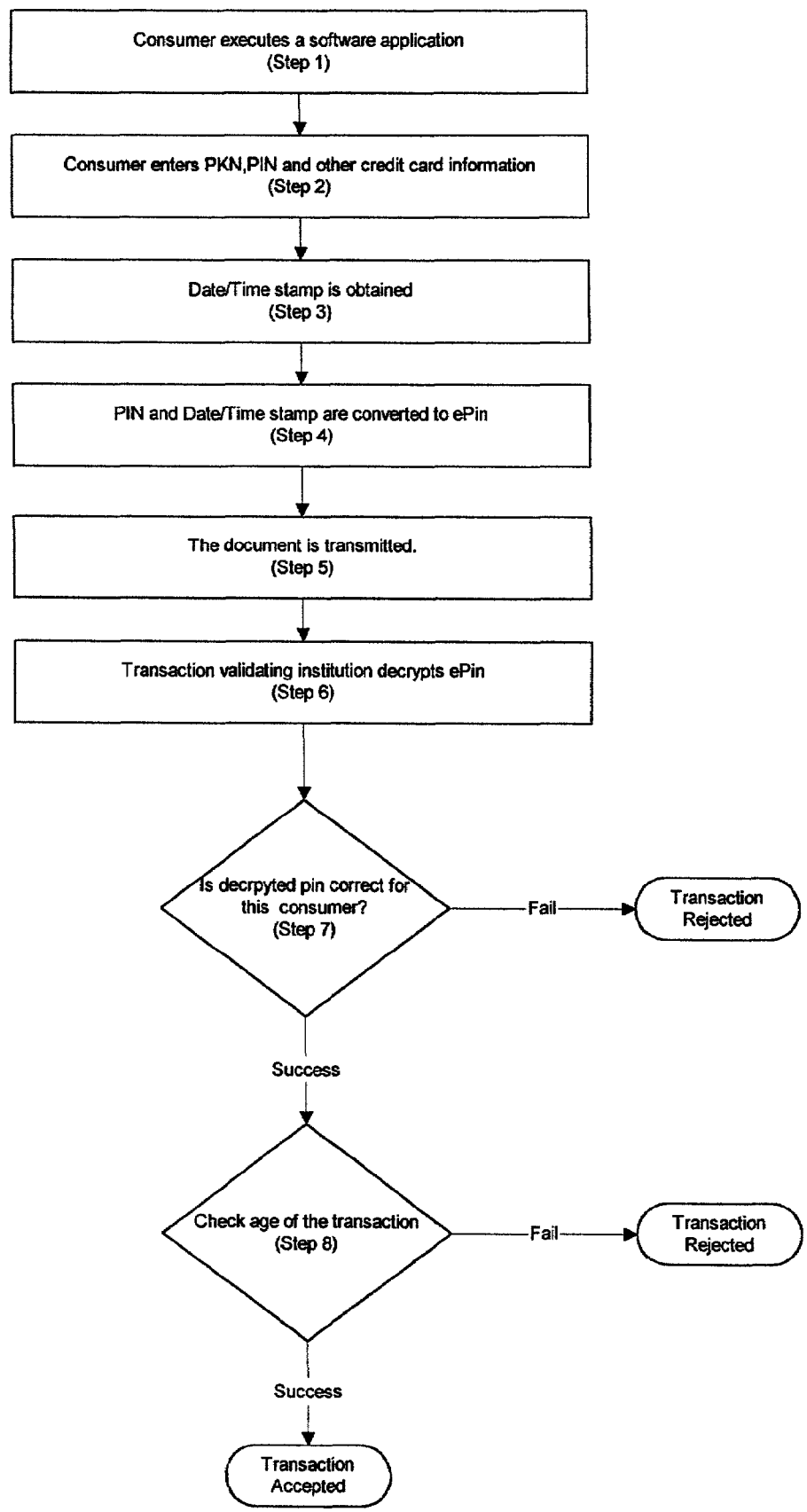
FIG. 2 shows a software flowchart of an alternative embodiment of the method of the present invention.

FIG. 2 illustrates another embodiment of the invention for use when a credit card issuer wishes to use a PIN (personal identifier number) and a public/private key encryption technique to secure the transaction. The validating institution, e.g., the credit card issuer, selects the encryption technology to be used. As with the embodiment of FIG. 1, various encryption programs known to persons skilled in the art may be used for this invention since the type of encryption technique is not critical to the invention described here. However, it is to appreciated that the better the encryption technique, the more secure the transaction will be. What is important is that the encryption scheme be known only to the institution validating the transaction and to the software that encrypts the date/time stamp when the customer information is entered. An advantage of a number of known public/private key encryption methods that may be used for this invention is that they are easy to use while providing transaction privacy.

As with the method of FIG. 1, this embodiment assumes as a preliminary matter that (a) individual credit card accounts have been established by a credit card issuer for a number of different users and that each account and its authorized user(s) are identified by unique identification codes, (b) a PIN has been assigned to each authorized user which is known only to the credit card issuer, the validating institution (if different from the credit card issuer), and the credit card holder or a user authorized by the credit card holder. It is to be understood also that the method of FIG. 2 applies to electronic transactions involving only the credit card user and the credit card issuer or validating institution, as well as to transactions involving a third party vendor from whom the user wishes to purchase goods or services. Accordingly, although not shown in FIG. 2, it is to be understood that if the proposed transaction involves a third party vendor, the transmittal of information between the user and validating institution is conducted via the vendor's server Referring now to FIG. 2, the method illustrated therein comprises the following steps 1. Using an internet browser, the consumer or customer executes a software application embodying the invention for the purpose of initiating a credit card transaction. As with the preferred embodiment of the invention represented in FIG. 1, the software application includes a component supplied by the credit card processing institution (and embedded in the software application or the browser) which is adapted to obtain and encrypt a date/time stamp, delivering an encrypted date/time stamp in the form of a series of alphanumeric values 2. The customer or user records (a) personal information required by the vendor for the transaction, e.g., name and address of the customer or other user, (b) a public key number (PKN), and (c) a private key number (the PIN). An example of a PKN is a credit card account number. However, the credit card issuer or other validating institution may elect to require use of another alphanumeric sequence as the PKN in addition to or in place of the credit card account number. As an alternative approach, it is envisioned that the public key (PKN) may be the PIN and the private key may be something known only to the institution and the ePIN software generator.

3. A date/time stamp is obtained from a non-adjustable time source via the internet, as described above.

4. The PIN and the date/time stamp are converted to an ePIN for transmission via the internet. In this step the software program uses the PIN along with the date/time stamp as the basis for creating an encrypted sequence of alphanumeric characters that constitute the ePIN. The latter hides the PIN and the date/time stamp so that they can be retrieved only by the validating institution. As an alternative approach, the software program may be designed to use all or part of the PKN as well as the PIN and the date/time stamp to generate the ePIN.

5. The data representing the transaction (the "document") is transmitted via the internet to the validating institution. The document includes the ePIN and the PKN, as well as other transaction data entered by the user which is requested by the validator, e.g., name and account number of the credit card holder. If a third party vendor is involved in the proposed transaction, the transmission of the data to the validating institution is accomplished via the vendor's server, and this may be done automatically or on command by the vendor.

6. The validating institution decrypts the ePIN to obtain the PIN and the date/time stamp.

7. The validating institution looks up the user's PIN in its database to determine if the transmitted PIN is valid. If it is valid, the checking continues; otherwise the transaction is rejected, and the rejection is communicated to the vendor and/or the customer or other party who initiated the transaction.

8. Next the validating institution checks the age of the transaction. More specifically, the decrypted date/time stamp representing the exact time the transaction was initiated is compared with a new date/time stamp created from the time obtained by the validating institution from a non-adjustable time source via the internet. The difference between the time of the date/time stamp assigned to the transaction (the "transaction date/time stamp") and the new date/time stamp representing the time obtained by the validating institution from the non-adjustable time source is compared against a known time limit known only to the entity that has the responsibility of validating or rejecting the transaction. If the time limit has been exceeded, the transaction is considered not to be valid and is rejected. If the time limit has not been exceeded, the transaction is validated (provided, of course, that the remainder of the transaction has been verified as being correct). As in step 7, the rejection is communicated to the vendor and/or the customer or other party who initiated the transaction.

With respect to validating the date/time stamp, it is to be understood that the credit card issuer or other validating institution sets the time period for a transaction to be valid, and that its server may be programmed to validate not only transactions which are presented for validation within the time limit but also those which exceed the time limit by a predetermined tolerance magnitude, e.g., to compensate for time delays due to heavy transaction traffic. Also although (a) the time represented by the date/time stamp is the time that the stamp is generated from the non-adjustable time source and (b) the date stamp may not be transmitted to the validating institution instantaneously upon being generated, for convenience it may be deemed to be and is characterized herein as the time that the proposed transaction is initiated, or as the "current transaction time", since the time difference is quite small, generally in the order of seconds.

It is contemplated that the invention may be practiced other than as described above. Thus according to an alternative version of the foregoing embodiments, the software executed in the browser first obtains a date/time stamp from a non-adjustable time source via the internet, but the encrypted date/time stamp is not generated by the program accessed by the user's browser; instead the date stamp is encrypted by the validating institution (validator) and delivered to the users (initiator's) browser via the internet. Accordingly, in this embodiment, the software code embedded in the browser may comprise the following:

y=GetEncrytedDateTimeFromInstitution( );
return y;

The embedded code for GetEncrytedDateTimeFromInstitution( ) is:

OpenSocket(InstitutionServer);
GetEncryptedDateTimeStamp( );
Close Socket( ):

For this embodiment, the Credit Card Institution Server contains the following code fragment:

x=nettime( );
y=encrypt(x);
return y

Other variations of the invention will be obvious to persons skilled in the art

The invention offers several advantages. For one thing, it can be implemented using known programming and encryption techniques. Secondly, it requires no special computer or communication equipment and hence can be implemented at relatively low cost. Thirdly it safeguards electronic transactions against fraud by introducing an additional layer of user identification that is time limited and hence is difficult, if not impossible, to circumvent. Fourthly it may be used to safeguard other electronic transactions in addition to ordinary credit card transactions involving a customer, a vendor and the credit card issuer, e.g., orders to transfer funds from a bank or other credit account. Other advantages will be obvious to persons skilled in the art.

What is claimed is:

1. A method of conducting electronic credit card transactions so as to guard against fraud, comprising the following steps:

using a computer program mandated by a credit card issuer, a user of a credit card issued by the credit card issuer (a) initiates a proposed credit card transaction with a third party vendor by accessing via said third party vendor a party authorized by said credit card issuer to validate credit card transactions, and (b) transmits and to said authorized party non-encrypted time-limited information concerning the user and an encrypted personal identification number that comprises in encrypted form a date/time stamp and certain information identifying said user;

said authorized party receives said encrypted time-limited personal identification number and said non-encrypted information and decrypts said encrypted time-limited personal identification number to derive said date/time stamp and said certain information identifying said user;

said authorized party (1) compares said non-encrypted and decrypted information with previously recorded user information to verify that the user initiating the proposed transaction is an authorized user and (2) also compares the current transaction time represented by said decrypted date/time stamp with the time of its receipt of said encrypted date/time stamp and determines if the difference, if any, between said times is within a predetermined time limit required for validating the proposed transaction; and depending on the determinations made in the forgoing step, said authorizing party (a) rejects said proposed transaction if said user is not verified to be an authorized user or if the difference between said times is not within said predetermined time limit and (b) approves said proposed transaction if said user is verified as an authorized user and the difference between said times is within said predetermined time limit.

2. A method for authorizing an electronic business transaction by an authorized user, comprising the steps of:
  (a) storing information about authorized users in a validating system;
  (b) receiving in the validating system for verification an encrypted time-limited personal identification number which is transmitted in connection with a proposed electronic business transaction at the request of a person who may or may not be an authorized user, said encrypted personal identification number comprising an encrypted date/time stamp and certain encrypted user-identifying information;
  (c) decrypting said received encrypted personal identification number to retrieve said date/time stamp and said certain encrypted user-identifying information;
  (d) comparing said decrypted certain user-identifying information with the authorized user information stored in said validating system to verify that said decrypted certain user-identifying information is valid, and rejecting the proposed transaction if said decrypted certain user-identifying information is not valid; and
  (e) if said decrypted certain user-identifying information is verified as valid, (1) determining from said decrypted time stamp if the age of the proposed transaction is within a predetermined time limit required for validating the transaction, and (2) rejecting the proposed transaction if the age of the proposed transaction is not within said predetermined time limit.

3. The method of claim 2 wherein said electronic transaction is a credit card transaction, and said certain user-identifying information comprises a credit card account designation.

4. The method of claim 2 wherein said encrypted code received by said validating system is transmitted to said validating system via a third party vendor, and, further wherein rejection or authorization of said proposed transaction is communicated by said validating system to said vendor.

5. The method of claim 2 wherein said encrypted personal identification number includes a public key and a private key.

6. A method of limiting the amount of time information pertaining to a credit card issued by a credit card issuer is valid for use in support of an electronic transaction with a vendor comprising the following steps:

A. a credit card user records credit card information required by the vendor, including credit card number, credit card expiration date, and the name of the credit card user;
  B. said user uses a computer program provided by the credit card issuer or a party acting on behalf of said credit card issuer to provide a date/time stamp representing the current date and time and to generate an encrypted personal identification number that comprises said date/time stamp and at least some of said recorded credit card information;
  C. said encrypted personal identification number is transmitted from said credit card user via said vendor to a party authorized by the credit card issuer to validate proposed credit card transactions;
  D. said party authorized by said credit card issuer to validate proposed credit card transactions conducts a validation process that comprises: (1) decrypting said encrypted personal identification number to retrieve said date/time stamp and said at least some recorded credit card information, (2) determining from said decrypted date/time stamp if the age of the proposed transaction is within a predetermined time limit required for validating the transaction, (3) comparing said decrypted credit card information with previously recorded credit card user information to verify that the party initiating the proposed credit card transaction is an authorized credit card user, and (4) depending on the determinations made in foregoing steps (D)(2) and (D)(3), communicating either a validation or rejection of the proposed transaction to the third party vendor and/or the party who initiated the proposed credit card transaction.

7. A method according to claim 6 wherein step B includes encryption of said credit card number.

8. A method for conducting credit card transactions so as to guard against fraud, said method comprising steps as follows:
  (a) a credit card user who proposes to carry out a credit card transaction with a third party vendor initiates the transaction by accessing a computer program supplied by the credit card issuer or a party acting on behalf of said credit card issuer that is constructed so as to (1) obtain a date/time stamp from a time source and (2) generate a time-limited personal identification number for the credit card user by encrypting said date/time stamp and certain required credit card information identifying the credit card user;
  (b) said credit card user supplies said certain required credit card information to said computer program and said computer program (a) obtains a date/time stamp and (b) generates a personal identification number comprising said date/time stamp and said certain required credit card information in encrypted form;
  (c) said personal identification number comprising said date/time stamp and said certain required credit card information in encrypted form is transmitted via said third party vendor to a validating system authorized to validate credit card transactions on behalf of said credit card issuer;
  (d) said validating system decrypts said personal identification code to derive the time as represented by said decrypted date/time stamp and also said certain required credit card information;
  (e) said validating system (1) compares said decrypted certain required credit card information with previously recorded user information to verify that the user initiating the proposed transaction is an authorized credit card user and (2) also compares the current transaction time represented by said decrypted date/time stamp with the time of its receipt and determines if the difference, if any, between said times is within a predetermined time limit; and (f) depending on the determinations made in foregoing steps (e)(1) and (e)(2), the validating system communicates either a validation or rejection of the proposed transaction to the third party vendor and/or the party who initiated the proposed credit card transaction.

9. A method according to claim 8 wherein said certain required information includes a credit card number and/or a private key number.

10. A method according to claim 8 wherein said computer program is installed on a computer containing a browser, and step (c) is conducted via the internet using said browser.

11. A method according to claim 8 wherein said computer program is installed on a remote server and is accessed by said credit card user.

12. A method for conducting electronic transactions so as to guard against fraud, said method comprising steps as follows:

(a) an entity who wishes to carry out an electronic transaction with a bank initiates the transaction by accessing a computer program supplied by said bank that is constructed so as to (1) obtain a date/time stamp in response to certain required information about the entity proposing to carry out the electronic transaction, and (2) generate a time-limited personal identification number (an "ePIN") by encrypting said date/time stamp and said certain required information, said certain required information including at least an account number or a private personal identification number representing said entity;

(b) said entity supplies said certain required information to said computer program and in response said computer program obtains a date/time stamp from a time source and generates an ePIN comprising said date/time stamp and said supplied certain required information;

(c) said ePIN is transmitted to and received by said bank or a validating party representing said bank;

(d) said receiving bank or validating party decrypts said received ePIN to derive said date/time stamp and said supplied certain required information;

(e) said receiving bank or validating party (1) compares said decrypted certain required information with previously recorded information in the possession of said bank or validating party to verify that the entity initiating the proposed transaction is an authorized entity and (2) also determines from said decrypted time stamp if the proposed transaction meets a predetermined time limit; and (f) depending on the determination made in steps (e)(1) and (e)(2), said bank or validating party communicates either a validation or rejection of the proposed transaction to the entity who initiated the proposed credit card transaction.

13. A method according to claim 12 wherein in step (c) said ePIN is transmitted to and received by said validating party, steps (e)(1) and (e)(2) are carried out by the validating party, and in step (f) the validating party communicates said validation or rejection of the proposed transaction to said bank.

14. A method for conducting credit card transactions so as to guard against fraud, said method comprising steps as follows:

(a) a credit card user who proposes to carry out a credit card transaction with a credit card issuer or a third party vendor initiates the transaction by accessing a computer program supplied by the credit card issuer or a party acting on behalf of said credit card issuer that is constructed so as to (1) obtain a date/time stamp from a time source and (2) generate a time-limited personal identification number (an "ePIN") by encrypting said date/time stamp and certain required credit card information identifying a credit card user;

(b) said credit card user causes said computer program to generate an ePIN characterized by and comprising in encrypted form (1) credit card information provided by said user and (2) a date/time stamp obtained by said computer program in response to accessing of said computer program by said credit card user;

(c) said ePIN is transmitted directly or via a third party vendor to a validating system authorized to validate credit card transactions on behalf of said credit card issuer;

(d) said validating system decrypts said ePIN to derive the time represented by the decrypted date/time stamp and said credit card information provided by said user;

(e) said validating system (1) compares said decrypted credit card information with previously recorded user information to verify that the user initiating the proposed transaction is an authorized credit card user and (2) determines from the decrypted date/time stamp whether the proposed transaction is within a predetermined time limit; and (f) depending on the determinations made in foregoing steps (e)(1) and (e)(2), the validating system communicates to the credit card issuer and the party who initiated the proposed credit card transaction, and also to the third party vendor, if any, either (1) a validation of the proposed transaction if the user is verified to be an authorized credit card user and the proposed transaction is within said predetermined time limit or (2) a rejection of the proposed transaction if the user is not verified to be an authorized credit card user or the proposed transaction is not within said predetermined time limit.

15. A method according to claim 14 wherein said ePIN comprises in encrypted form a credit card number and also a non-public personal identification code.

16. A method according to claim 14 wherein step (c) also includes transmitting to the validating system other non-encrypted information relating to the identity of the party who initiates the transaction and/or to the subject matter of the transaction.

17. A method according to claim 1 wherein said computer program is installed on a personal computer containing a browser, and said encrypted personal identification number is transmitted to said authorized party via the internet using said browser.

18. A method according to claim 2 wherein said validating system receives said time-limited personal identification number via the internet.

19. A method according to claim 6 wherein said computer program is installed on a personal computer and said encrypted personal identification number is transmitted from said computer via said vendor to said party authorized by the credit card issuer to validate proposed credit card transactions.

* * * * *

UNITED STATES PATENT AND TRADEMARK OFFICE
CERTIFICATE OF CORRECTION

| | | |
|---|---|---|
| PATENT NO. | : 7,107,242 B1 | Page 1 of 1 |
| APPLICATION NO. | : 09/718179 | |
| DATED | : September 12, 2006 | |
| INVENTOR(S) | : Paul E. Vasil et al. | |

It is certified that error appears in the above-identified patent and that said Letters Patent is hereby corrected as shown below:

On Title Page (item 76)

Page 1, change the name of the inventor "Ronald W. Sandstorm" to -- Ronald W. Sandstrom --.

Column 6, claim 1, line 63, delete "and".

Column 7, claim 1, line 16, change "forgoing" to -- foregoing --.

Column 7, claim 1, line 17, change "authorizing" to -- authorized --.

Signed and Sealed this

Twenty-eighth Day of November, 2006

JON W. DUDAS
*Director of the United States Patent and Trademark Office*